WHEEL COVER
Filed Sept. 23, 1957 2 Sheets-Sheet 1
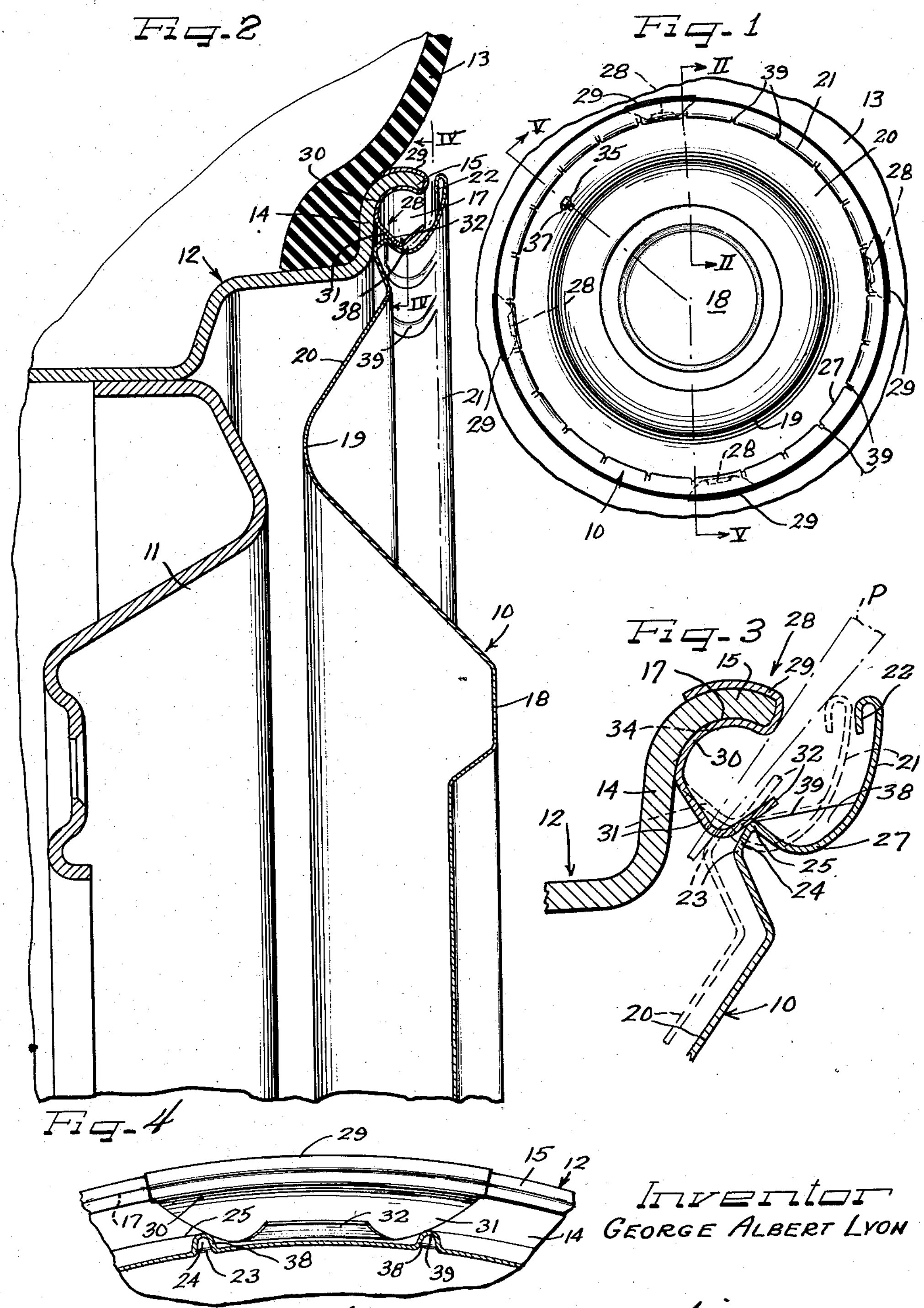
Inventor
George Albert Lyon
by Hill, Sherman, Meroni, Gross & Simpson Attys.

Dec. 13, 1960 G. A. LYON 2,964,358
WHEEL COVER
Filed Sept. 23, 1957 2 Sheets-Sheet 2
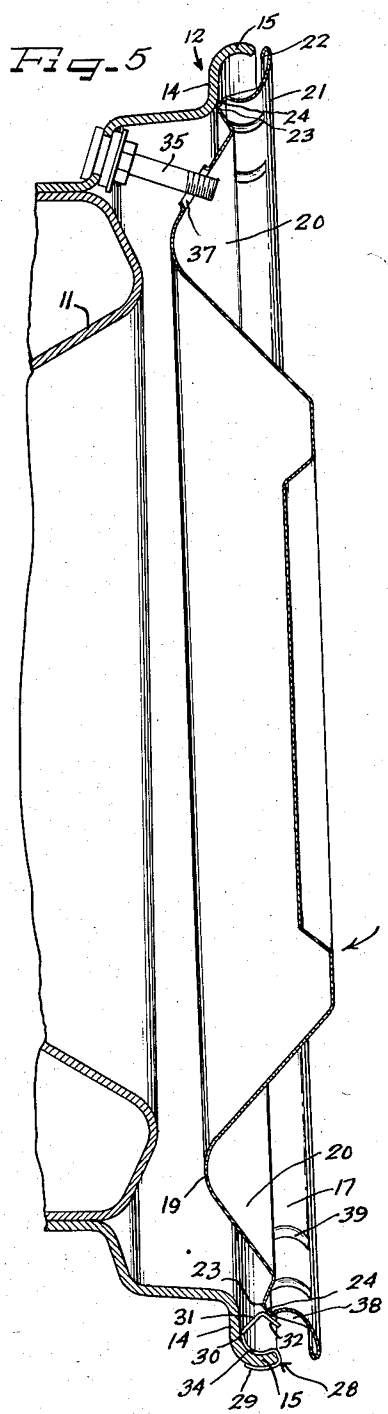
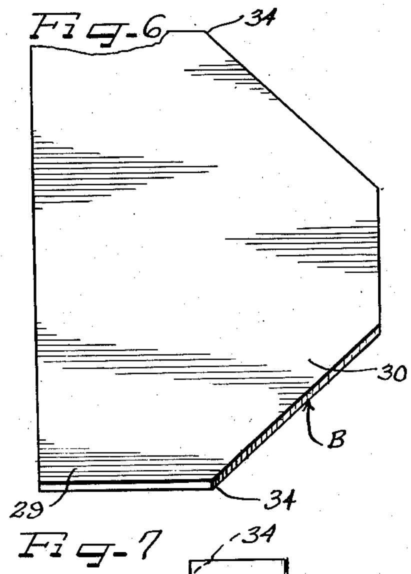
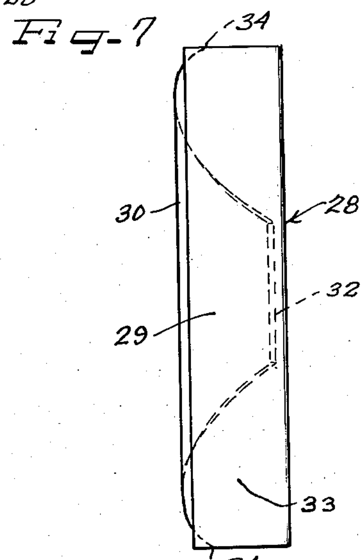
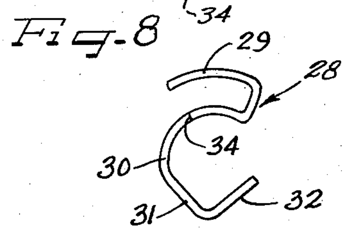
Inventor
GEORGE ALBERT LYON
by Hill, Sherman, Meroni, Gross & Simpson Attys.

United States Patent Office 2,964,358

Patented Dec. 13, 1960

2,964,358

WHEEL COVER

George Albert Lyon, 13881 W. Chicago Blvd., Detroit, Mich.

Filed Sept. 23, 1957, Ser. No. 685,616

12 Claims. (Cl. 301—37)

The present invention relates to improvements in wheel structures and more particularly concerns the ornamental and protective covering of the outer sides of vehicle wheels.

An important object of the present invention is to provide an improved wheel structure including novel means for retaining a cover on the outer side of the wheel.

Another object of the invention is to provide improved means for retaining a wheel cover in snap-on, pry-off relation to the tire rim of a vehicle wheel and more particularly the terminal flange of such rim.

A further object of the invention is to provide improved retaining clip means to be mounted on the terminal flange of a tire rim for maintaining a cover in snap-on, pry-off relation on the outer side of the wheel.

Still another object of the invention is to provide cover retaining spring clip means for self-retaining engagement with a rim flange in a manner to resist strongly any tendency to become dislodged incident to removal of the cover from the wheel by snapping it free from the retaining clips.

Yet another object of the invention is to provide an improved retaining clip structure for retaining wheel covers on a vehicle wheel in snap-on, pry-off relation and provided with interlock and anchoring means for bitingly engaging with the wheel with maximum force when pressure is applied to the clip by engagement with the cover, and more especially during pry-off leverage applied to the cover.

It is still another object of the invention to provide improved cover retaining means which will strongly resist turning of the cover on the wheel.

Other objects, features and advantages of the present invention will be readily apparent from the following detailed description of a preferred embodiment thereof taken in conjunction with the accompanying drawings, in which:

Figure 1 is an outer side elevational view of a wheel structure embodying features of the invention;

Figure 2 is an enlarged fragmentary radial sectional detail view taken substantially on the line II—II of Figure 1;

Figure 3 is a further enlarged fragmentary radial sectional detail view taken substantially in the same plane as Figure 2 but showing the cover in process of being applied to or removed from the wheel;

Figure 4 is a fragmentary sectional elevational detail view taken substantially on the line IV—IV of Figure 2;

Figure 5 is a transverse sectional detail view through the wheel structure taken substantially on the line V—V of Figure 1 and showing how the cover is manipulated in applying the same to the outer side of the wheel;

Figure 6 is an isometric view of a metal blank from which one of the spring retaining clips of the present invention is adapted to be made;

Figure 7 is a rear elevational view of one of the retaining clips; and

Figure 8 is an end elevational view shown in Figure 7.

A wheel cover 10, which is adapted to be made as a pressed or stamped circular member from suitable sheet material such as stainless steel, brass, aluminum alloy or the like, is adapted to be applied in covering relation to the outer side of a vehicle wheel including a disk spider wheel body 11 and a tire rim 12 of the multi-flange drop center type adapted to support a pneumatic tire 13. At its outer side the tire rim 12 has a terminal flange structure including a generally radially outwardly extending and axially outwardly facing portion 14 and a generally radially inwardly facing and axially outwardly extending portion 15 joined thereto and turned slightly radially inwardly at its tip whereby a generally radially inwardly opening groove 17 is provided.

In the present instance, the cover 10 includes a central crown portion 18 leading into an intermediate annular dished portion 19 from which extends generally radially and axially outwardly obliquely an annular cover portion 20 for overlying the tire rim. At its outer extremity, the cover portion 20 has an annular terminal flange overlying marginal portion 21 with the edge extremity turned under to provide a reinforcing and finishing bead 22 which in assembled relation with the wheel is adapted to lie in adjacent spaced relation to the tip of the terminal flange lip portion 15.

At the radially inner side of the marginal portion 21 of the cover and disposed on a diameter for bottoming engagement with the radially inner portion of the terminal flange portion 14 is provided an annular indented generally axially inwardly directed reinforcing and bottoming rib 23, with a narrow generally radially and axially outwardly oblique flange 24 sloping from the shoulder extremity of the rib and joining a generally annular radially outwardly projecting shoulder 25 at the axially inner side of a generally radially outwardly opening groove 27 at the radially inner side of the cover marginal portion 21. It will be observed that the marginal portion 21 provides with the rim terminal flange portions 14 and 15 a substantial chamber within which wheel balancing weights may be accommodated.

For retaining the cover 10 on the outer side of the wheel in press-on, pry-off relation, a plurality of cover retaining spring clips 28 are provided which are constructed and arranged to be retainingly engaged with the terminal flange lip portion 15 and to be retainingly engageable with the cover shoulder 25. In the present instance, four of the clips are shown in Figure 1 although it will be appreciated that a smaller or larger number of the clips may be used as preferred.

Each of the clips 28 is of a generally S-shape having a rim engaging loop portion 29 generally conformed or complementary to the radially outer curved shape of the terminal flange portion 15 and the tip of such terminal flange portion and joined to a reversely bent larger combination cover retaining and rim gripping loop portion 30. In effect, of course, the radially inner portion of the loop 29 and the radially outer portion of the loop 30 are common to each of the loops, and as shown (Figs. 2 and 3), substantially intimately complementally conformably shaped to fit retainingly within the rim flange groove 17, with the rim flange lip portion 15 gripped between the outer leg of the loop 29 and its inner leg which is common to the loop 30.

The inner portion of the clip loop 30 is constructed and arranged for press-on, pry-off interengagement with the cover shoulder 25 and for this purpose is provided with a generally radially inwardly and axially outwardly obliquely projecting cover retaining shoulder 31 adapted to extend divergently relative to the terminal flange portion 14 and joining a generally radially and axially outwardly turned cam or lead-in terminal flange portion 32, with juncture of the clip shoulder and flange portions 31 and 32 projecting radially inwardly to a diameter somewhat smaller than the diameter of the cover shoulder 25, in the asesmbled relationship of the clip to the terminal flange.

Both of the loops 29 and 30 of the retaining clip 28 are of resilient springy flexibility, but the rim flange engaging loop 29 is of somewhat stiffer structure so as to maintain a thorough grip on the rim flange 15 after being pressed into engagement therewith, or hammered into such engagement. In applying the loop 29 to the rim flange, it is worked and snapped into position from the tip of the terminal flange portion 15, and the common leg of the loops 29 and 30 lockingly engages within the rim flange groove 17. Thereby, the undercut shoulder provided by the turned in or overhanging tip portion of the terminal flange lip 15 retains the inner, interlocking leg of the loop 29 against axially outward displacement in cooperation with the strong resilient gripping retaining embrace effected by the generally parallel, complementary opposed inner and outer legs or arms of the clip loop 29.

In order further to enhance the retaining engagement of the clip 28 with the terminal flange portion 15, the intermediate common leg of the loops 29 and 30 is constructed to be stiff and deformation-resistant across its width and being substantially resiliently resistant to curling, leaf flexing or spring bending about a transverse axis running through the sides of the clip or the loop 30. To this end, the rim-engaging loop 29 and the intermediate or common clip loop leg are herein throughout their length of the full width of the clip with the loop 30 tapering progressively to its tip at each side of the clip from respectviely juncture corners or points 34 (Figs. 3, 5, 7 and 8) which provide anchoring spurs that are bitingly, grippingly engageable with the opposed wall surfaces defining the rim flange groove 17. In this manner, the clip 28 is greatly stabilized against transverse deflection of the clip loops by twisting about an axis longitudinally through the clip terminals, and is also thoroughly anchored by the biting engagement of the sidewardly projecting spur points 34 against circumferential displacement relative to the rim flange.

In a convenient, economical form the retaining clip 28 is adapted to be made from an angular piece of hard spring-quality steel identified at B in Figure 6. The two opposite sides of the blank B are trimemd off to provide the respective opposite tapered sides of the springy clip loop 30. The remainder of the blank remains full width to provide the rim flange engaging loop 29, with the side anchoring spur points 34 at the side junctures of the two clip loop sections or portions of the blank. The blank B in an annealed condition is bent from each opposite end to provide the respective spring loops 29 and 30, with the loop 29 being formed from the full width portion of the blank, with the spur points 34 disposed at the inner end of the common intermediate leg of the clip loops. After the clip has been shaped, it is preferably subjected to hardening to impart spring steel hardness and resilience.

In applying the cover retaining spring clips 28 to the tire rim, two of the clips 28 are preferably located in equally spaced relation at respectively opposite sides of a valve stem 35 projecting in the usual manner from the side of the tire rim. Another two of the retaining clips 28 are attached to the rim flange 15 on the opposite side of the wheel equidistantly spaced from the first mentioned two clips and similarly spaced from one another so as to provide a symmetrical circumferentially spaced series of the spring clips.

In applying the cover 10 to the wheel, a valve stem aperture 37 in the cover portion 20 is initially registered with the valve stem 35 as shown in Figure 5. The most convenient manner of effecting such registration is by canting the cover 10, as shown, toward the valve stem 35 until the valve stem extends through the valve stem aperture 37 and the annular bottoming shoulder 23 of the cover in the portion thereof radially aligned with the valve stem aperture 37 engages the tire rim. In the canted position, the slanted annular flange portion 24 radially outwardly along the bottoming shoulder 23 serves as an advantageous lead cam surface to follow smoothly over the shoulder at the radially inner side of the terminal flange portion 14 as the leading portion of the cover is moved both axially inwardly and radially outwardly relative to the valve stem 35.

As the leading portion of the cover is registered with the valve stem 35, the retaining clips 28 which flank the valve stem have the radially inwardly projecting cover-retaining nose portions of the clip loops 30 engaged within the radially outwardly opening cover groove 27. At the end of the radially outward assembly movement, therefore, the retaining shoulder 25 of the cover will be substantially retainingly engaged behind the retaining flange shoulder 31 of the valve stem-flanking retaining clips 28.

At the conclusion of the valve stem registering, initial assembly movement of the cover 10, the side of the cover opposite the valve stem aperture 37 is pressed axially inwardly about the fulcrum provided by the rim flange engaging portion of the bottoming shoulder 23 aligned with the valve stem 35. As a result, the cam flange, slanted intermediate portion 24 and the axially inner side of the rib-shoulder 25 of the cover engage the lead-in terminal flange portion 32 of the remaining spring clips 28 as shown in Fig. 5. As the axially inward assembly pressure is continued on the outwardly canted side of the cover, the retaining clip terminal flange portions 32 cam radially outwardly by yielding of the clip loop 30 and more particularly the shoulder flange portions 31 and adjacent areas of the clip loop as indicated in dash outline in Fig. 3 until the retaining shoulder 25 of the cover has passed the radially inner noses of the retaining clip loops and snaps behind the clip shoulders. Immediately after the snap-in action, the cover shoulder 23 bottoms against the rim flange 14 and the clip shoulder flange portions 31 spring back into overlying engaging relation to the cover shoulder 25 whereby strongly to clamp the intervening portion of the cover against the tire rim.

During press-on of the cover and radially outward yielding of the clip inner leg portions, there is a strong resilient radially outward reaction of the tire rim flange engaging portion of the clip loop 30 and more particularly the common intermediate leg portion of the clip into the rim groove 17 for enhancing the retaining grip of the clip on the rim flange 15. This enhanced retaining grip persists uniformly and with substantially equalized thrust throughout all of the clips after the cover has been entirely seated on the wheel and with each of the retaining clip shoulder flange portions tensioned in engagement with the wheel shoulder 25. In other words, the cover reacting with the clips effects a firm back-up of the intermediate clip leg into the rim flange groove 17. This enhances the biting retaining anchoring coaction of the clip spur points 34 with the surface of the rim flange 15.

Since the retaining clips 28 are firmly anchored against circumferential, that is, sidewise displacement relative to the tire rim by the edges provided by the spur points 34 digging into the tire rim flange surface, means are provided for anchoring the cover 10 against turning relative to the spring clips 28 and thus against turning relative to the wheel due to service torque forces. To this end, respective spaced opposed shoulders 38 are provided within the cover groove 27 spaced apart sufficiently for easy reception therebetween of a retaining clip retaining leg (Fig. 4). In the present instance, the shoulders 38 are provided by offsetting indentations 39 pressed radially outwardly in the cover groove 27. By opposing the respective opposite sides of the inner clip leg 31, 32 disposed therebetween, the opposed shoulders 38, providing a clip-receiving pocket, retain the cover against turning since the retaining clips are quite stiffly resistant to circumferential distortion or displacement of the retaining inner leg portons thereof.

Removal of the cover 10 from the wheel is readily effected by means such as a pry-off tool P (Fig. 3) which may comprise a screwdriver or the like. The pry-off tool is readily engageable in the gap between the underturned reinforcing edge bead 22 of the cover and the tip of the terminal flange 15 and pry-off leverage applied to at least partially move the engaged marginal portion of the cover axially outwardly as permitted by resilient wind-up flexure of the retaining leg portion 31 of the adjacent retaining clip or clips. Since the retaining clips are preferably stiffly resilient for maximum retaining function, additional pry-off leverage is desirably effected by engaging the tip of the pry-off tool behind the cover shoulders 23 and 25 for thereby exerting the pry-off leverage in substantially direct axially outward direction in line with the engaged retaining shoulder 25 and even somewhat radially inwardly therefrom as the bottoming shoulder 23 is engaged by the pry-off tool.

As the pry-off force effects radially outward yielding of the inner leg portion of the clip 28, there is a resilient windup or rolling back action which reacts toward the intermediate clip leg in the terminal flange groove 17, thrusting into the rim groove and behind the overhanging shoulder at the axially outer side thereof to thus quite effectively resist axially outward pulling off of the clip as the pry-off leverage on the cover displaces the cover from the clip by snapping the shoulder 25 past the inner retaining nose portion of the clip.

It is therefore apparent that the retaining clips 28 are not only effectively locked on the tire rim for efficient cover retaining action by virtue of the interaction with the retained cover, but the clips actually engage in even more firm relation with the terminal flange during pry-off and thus resist dislodgment during pry-off. In this connection the wide rim-engaging clip loop 29, and the juncture points 34 engaging in substantially spaced, stabilized relation behind the undercut shoulder of the rim flange portion 15, substantially enhance resistance of the clips against pulling off during pry-off.

It will be understood that modifications and variations may be effected without departing from the scope of the novel concepts of the present invention.

I claim as my invention:

1. In a wheel structure including a tire rim having a terminal flange with a generally axially outwardly facing portion leading to a generally axially outwardly turned and radially inwardly facing extremity or lip portion, a cover retaining clip having a stiffly resilient loop portion generally conformably engageable with the terminal flange extremity lip portion and a cover retaining generally more flexible loop portion arranged to overlie the axially outwardly facing portion of the terminal flange, and the clip loops having a common intermediate leg substantially wider than the remainder of the cover retaining loop portion of the clip and said intermediate leg being backed up in stabilizing relation against the radially inner face of said terminal flange turned extremity lip portion.

2. In a wheel structure including a tire rim having a terminal flange with a generally axially outwardly facing portion leading to a generally axially outwardly turned and radially inwardly facing extremity or lip portion, a cover retaining clip having a stiffly resilient loop portion generally conformably engageable with the terminal flange extremity lip portion and a cover retaining generally more flexible loop portion arranged to overlie the axially outwardly facing portion of the terminal flange, and the clip loops having a common intermediate leg substantially wider than the remainder of the cover retaining loop portion of the clip and said intermediate leg being backed up in stabilizing relation against the radially inner face of said terminal flange turned extremity lip portion, said intermediate clip leg having generally circumferentially directed side projections providing anchoring spurs bitingly engaging the opposed surface of the rim flange extremity lip portion to retain the clip against circumferential displacement on the rim.

3. In a wheel structure including a tire rim having a terminal flange with a generally axially outwardly facing portion leading to a generally axially outwardly turned and radially inwardly facing extremity or lip portion, a cover retaining clip having a stiffly resilient loop portion generally conformably engageable with the terminal flange extremity lip portion and a cover retaining generally more flexible loop portion arranged to overlie the axially outwardly facing portion of the terminal flange, and the clip loops having a common intermediate leg substantially wider than the remainder of the cover loop portion of the clip and said intermediate leg being backed up in stabilizing relation against the radially inner face of said terminal flange turned extremity lip portion, said intermediate clip leg having at its inner end side projections providing sharp spur points that project in respectively opposite circumferential directions for bitingly engaging the opposed surface of the rim flange extremity lip portion to retain the clip against circumferential displacement on the rim.

4. In a wheel structure including a tire rim with a terminal flange having radially and axially extending portions, retaining spring clips anchored to the axially extending portion and overlying the radially extending portion, and a cover for disposition at the outer side of the wheel including a circular rim flange overlying portion having an underturned shoulder structure engageable against the radially extending rim flange portion and resiliently behind the portions of the spring clips overlying said radially extending rim flange portion.

5. In a wheel structure including a tire rim with a terminal flange having radially and axially extending portions, retaining spring clips anchored to the axially extending portion and overlying the radially extending portion, and a cover for disposition at the outer side of the wheel including a circular rim flange overlying portion having an underturned shoulder structure engageable against the radially extending rim flange portion and resiliently behind the portions of the spring clips overlying said radially extending rim flange portion, said cover shoulder structure including a bottoming shoulder engageable with the radially extending rim flange portion and a clip engaging shoulder spaced therefrom.

6. In a wheel structure including a tire rim with a terminal flange having radially and axially extending portions, retaining spring clips anchored to the axially extending portion and overlying the radially extending portion, and a cover for disposition at the outer side of the wheel including a circular rim flange overlying portion having an underturned shoulder structure engageable against the radially extending rim flange portion and resiliently behind the portions of the spring clips overlying said radially extending rim flange portion, said cover shoulder structure including a bottoming shoulder engageable with the radially extending rim flange portion and a clip engaging shoulder spaced therefrom, said spaced cover shoulders being joined by a narrow reinforcing flange portion.

7. In a wheel structure including a tire rim having a terminal flange provided with an inner generally radially extending and axially outwardly facing portion and an outer terminal generally axially outwardly extending portion and a valve stem located axially and radially inwardly from the terminal flange, a pair of cover retaining clips disposed in circumferentially spaced relation mounted on the terminal flange with a portion engaging the extremity portion of the terminal flange and a portion overlying the inner radially extending portion of the terminal flange and with the clips located in flanking relation at respectively opposite sides of the valve stem, additional retaining clips carried by the terminal flange on the opposite side of the wheel from the valve stem, and a cover for disposition at the outer side of the wheel including a valve stem aperture and a marginal clip engageable shoulder structure with a portion of the cover marginal shoulder structure engageable cammingly against the radially extending terminal flange portion in alignment with the valve stem as the cover is canted toward the valve stem for registration of the stem through said valve stem aperture and the cover marginal shoulder structure is engaged retainingly with said flanking retaining clips and thereafter snapped into engagement with said additional clips by axially inward pressure against the opposite side of the cover from said valve stem aperture until said cover marginal portion structure is entirely engaged with the radially extending terminal flange portion.

8. In a wheel structure including a tire rim having a terminal flange provided with an inner generally radially extending and axially outwardly facing portion and an outer terminal generally axially outwardly extending portion and a valve stem located axially and radially inwardly from the terminal flange, a pair of cover retaining clips disposed in circumferentially spaced relation mounted on the terminal flange with a portion engaging the extremity portion of the terminal flange and a portion overlying the inner radially extending portion of the terminal flange and with the clips located in flanking relation at respectively opposite sides of the valve stem, additional retaining clips carried by the terminal flange on the opposite side of the wheel from the valve stem, and a cover for disposition at the outer side of the wheel including a valve stem aperture and a marginal clip engageable shoulder structure with a portion of the cover marginal shoulder structure engageable cammingly against the radially extending terminal flange portion in alignment with the valve stem as the cover is canted toward the valve stem for registration of the stem through said valve stem aperture and the cover marginal shoulder structure is engaged retainingly with said flanking retaining clips and thereafter snapped into engagement with said additional clips by axially inward pressure against the opposite side of the cover from said valve stem aperture until said cover marginal portion structure is entirely engaged with the radially extending terminal flange portion, said cover marginal shoulder structure having an oblique cam lead surface portion engageable cammingly with the radially inner portion of the radially extending rim terminal flange portion during the canted assembly movement of the cover.

9. In a cover retaining clip for engagement with a tire rim terminal flange to maintain a wheel cover in assembled relation with the wheel, a spring material common spring leg of substantial width having on one side thereof a retaining loop turned in one direction for engagement with a rim flange and on the other side thereof and turned in the opposite direction a substantially larger spring loop for engagement with a retaining shoulder of a cover, said common leg and said retaining loop being wider and substantially more resistant resiliently to flexure than said larger loop and being highly resistant to bending thereacross due to the greater width, thereby affording great stability and resistance to transverse deflection of the respective loops.

10. In a cover retaining clip for engagement with a tire rim terminal flange to maintain a wheel cover in assembled relation with the wheel, a spring material common spring leg of substantial width having on one side thereof a retaining loop turned in one direction for engagement with a rim flange and on the other side thereof and turned in the opposite direction a substantially larger spring loop for engagement with a retaining shoulder of a cover, said common leg and said retaining loop being wider and substantially more resistant resiliently to flexure than said larger loop and being highly resistant to bending thereacross due to the greater width, thereby affording great stability and resistance to transverse deflection of the respective loops, said common leg having at the side extremities thereof spur-like sidewardly projecting spur points engageable as anchors with an opposing wheel surface preventing sidewise displacement of the clips relative to said surface, said larger spring loop having the sides thereof tapering from said spur points to the tip thereof.

11. In a wheel structure including a tire rim having a terminal flange including a radially outwardly extending and axially outwardly facing portion leading into a generally axially outwardly extending and radially inwardly facing lip portion providing a generally radially inwardly opening groove, a circumferentially spaced series of cover retaining spring clips each of which has a terminal lip flange gripping loop and a radially inner cover retaining loop which overlies the radially extending terminal flange portion, said clip loops having a common leg which is curved to fit in complementally conformable relation retainingly within said groove, said cover retaining clip loop in each instance including a radially inner portion providing on the radially inner side thereof a generally radially and axially inwardly facing shoulder opposing the radially innermost portion of said radially extending terminal flange portion, and a cover member having an outer marginal portion for overlying the terminal flange and provided with retaining shoulder means thereon engaging said clip shoulders and thereby effecting radially outward yielding of said radially inner cover retaining loop portion and strong resilient radially outward reaction toward said common clip leg into said groove for enhancing the gripping of the common clip leg by firm back-up thereof into the groove, said shoulder means of the cover member comprising a rigid annular indented rib in said terminal flange overlying portion of the cover member and said indented rib seating firmly on said radially inner portion of the radially extending terminal flange portion.

12. In a wheel structure including a tire rim having a terminal flange including a generally axially outwardly projecting lip portion having radially inner and radially outer sides, a cover retaining clip formed from a piece of resilient sheet metal and including a leg grippingly engaging the radially outer side of the rim flange lip portion and a radially inner leg effecting gripping clamping engagement with the radially inner side of the rim flange lip portion, said radially inner leg having side spur corners in anchoring biting engagement with said radially inner side of the terminal lip flange portion, said radially inner leg having thereon a shoulder retainingly engageable by a wheel cover in press-on, pry-off relation, said spur corners by their anchoring biting engagement with said radially inner side of the rim flange terminal lip portion affording substantial stability against twisting or canting distortions or displacement of the retaining clip despite substantial twisting or pulling or torsional forces thereon incident to application or removal of the cover or pressure against the cover in service.

References Cited in the file of this patent

UNITED STATES PATENTS

| | | |
|---|---|---|
| 1,800,173 | Anderson | Apr. 7, 1931 |
| 2,137,416 | Rubsam | Nov. 22, 1938 |
| 2,202,129 | Turner | May 28, 1940 |
| 2,281,153 | Horn | Apr. 28, 1942 |
| 2,351,655 | Aske | June 20, 1944 |
| 2,359,248 | Rubsam | Sept. 26, 1944 |
| 2,421,385 | Lyon | June 3, 1947 |
| 2,576,724 | Pouell | Nov. 27, 1951 |
| 2,609,245 | Lyon | Sept. 2, 1952 |
| 2,621,978 | Lyon | Dec. 16, 1952 |
| 2,714,041 | Lyon | July 26, 1955 |
| 2,733,104 | Lyon | Jan. 31, 1956 |
| 2,757,975 | Lyon | Aug. 7, 1956 |
| 2,910,323 | Spisak | Oct. 27, 1959 |